Patented Jan. 5, 1954

2,665,286

UNITED STATES PATENT OFFICE 2,665,286

PRODUCTION OF ORGANO-TIN COMPOUNDS

Herbert J. Passino, Englewood, N. J., and George G. Lauer, New York, N. Y., assignors, by mesne assignments, to Metal and Thermit Corporation, New York, N. Y., a corporation of New Jersey No Drawing. Application December 20, 1949, Serial No. 134,115

12 Claims. (Cl. 260—429)

This invention relates to the production of organo-tin compounds. In one aspect, the invention relates to the production of butyl tin chlorides. More particularly in this aspect, the invention relates to the production of dibutyl tin dichloride by the interaction of butyl chloride, stannic chloride and metallic sodium.

The interaction of the above-mentioned components results in a product which normally comprises dibutyl tin dichloride and sodium chloride, although other organo-tin compounds are usually present in the resulting product, depending upon the conditions under which the interaction of these components was effected, such as monobutyl tin trichloride, tributyl tin monochloride, tetrabutyl tin and hexabutyl ditin. The characteristic property, however, of dibutyl tin dichloride to act as a thermal stabilizer when incorporated in vinyl resins makes its production by the interaction of the above-mentioned components of particular importance. In accordance with such procedure, the stoichiometric quantities of the components required for producing dibutyl tin dichloride may be represented as follows:

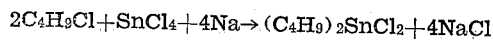

$2C_4H_9Cl + SnCl_4 + 4Na \rightarrow (C_4H_9)_2SnCl_2 + 4NaCl$

The reaction may be carried out by adding a mixture of the butyl chloride-stannic chloride components to the metallic sodium which may be present as a previously formed suspension of metallic sodium in an inert solvent. The stannic chloride-butyl chloride mixture is heated to the reaction temperature, preferably above 30° C. and is agitated during the addition to the metallic sodium suspension. The sodium chloride is separated from the resulting dibutyl tin dichloride product by centrifuging and the dibutyl tin dichloride product thus recovered may be further treated to separate other undesired by-products, such as other organo-tin compounds.

This method has disadvantages, however, in that the reaction does not begin until an appreciable quantity of the stoichiometric requirements of butyl chloride and stannic chloride have been added, and the reaction, once started, may proceed too violently and become difficult to control. If lower temperatures are employed to limit the violence of the reaction, for practical use, the metallic sodium is not completely consumed, whereupon the salt cake separated from the dibutyl tin dichloride end-product may contain particles of metallic sodium which constitute a fire hazard. Apart from the above, the addition of the stannic chloride component to the metallic sodium suspension, involves a condition in which a substantial portion of the metallic sodium is lost by the reduction of stannic chloride to stannous chloride, thereby reducing the ultimate yield of the desired dibutyl tin dichloride end-product.

It is, therefore, an object of this invention to provide an improved process for the production of dibutyl tin dichloride.

Another object of the invention is to provide an improved process for the production of dibutyl tin dichloride, efficiently and in a safe manner.

Still another object of the invention is to provide an improved process for the production of dibutyl tin dichloride without any undesirable side-reactions taking place.

Other objects and advantages inherent in the invention will be apparent from the following more detailed disclosure.

The improved process of this invention differs from the method described above primarily in the fact that the butyl chloride and stannic chloride are first mixed in stoichiometric proportions, after which the metallic sodium is added under carefully controlled conditions to complete the reaction. The reaction rate is greatly affected by temperature and the reaction is started by heating the reactants to a temperature greater than 60° C., with a temperature of at least 95° C. being preferred. It is found that temperatures approximating the melting point of sodium produce a satisfactory reaction rate. Whether this is an effect of temperature alone or results from the molten condition of the sodium is not certain. The rate at which the sodium is added to the reaction mixture is based entirely upon the requirement for controlling the temperature of the reaction mass this in turn being affected largely by the means provided for dissipating the heat of reaction. When means are provided for cooling the reaction mass and rapidly mixing the components of the reaction mass, the metallic sodium may be added more rapidly than under less favorable conditions. To assist in the dissipation of heat from the centres of reaction, a relatively inert solvent for the butyl chloride, stannic chloride and dibutyl tin dichloride may be added, such as a relatively low boiling paraffin (e. g. hexane, heptane or octane), 40–60° petroleum ether, benzene or toluene. This solvent increases the bulk of the reaction mass and thus assists in dissipating the heat of reaction and also assists in washing the dibutyl tin dichloride product from the salt cake product.

The process may be carried out continuously by adding the metallic sodium in stoichiometric proportion to a preformed preheated mixture of the butyl chloride and stannic chloride, the resulting reaction mass then being passed through an elongated reaction zone which is cooled to absorb the heat of reaction. However, in the preferred embodiment of the invention, a batch system is employed in which the quantity of butyl chloride and stannic chloride and solvent are charged to the reaction zone and preheated to the reaction temperature. The metallic sodium is then added step-wise at a rate consistent with the control of the reaction. As the preferred reaction temperature is above the boiling point of the butyl chloride and may be above the boiling point of the solvent, substantial vaporization occurs during the reaction. Such vaporization, however, may be avoided by proper increase in pressure in the reaction zone, which is readily ascertainable by those skilled in the art. On the other hand, it is also possible to recapture and return materials vaporized from the reaction mass, and for this purpose a reflux condenser may be associated with the reaction zone. The vaporization of materials in the reaction mass serves to remove heat of reaction therefrom and prevents over-heating, this heat being removed from the reaction zone by the cooling means employed in the reflux condenser.

As indicated above, it is preferred to start the reaction by heating the reactants to a temperature greater than 60° C. However, for the utmost efficiency in bringing the sodium into the reaction, it is preferred to maintain a temperature condition of at least about 95° C. and not substantially higher than 110° C., with temperatures between about 97.5° C. and about 100° C., or slightly higher, being found to produce the most favorable results. Furthermore, it will also be noted that the metallic sodium added to the above-mentioned heated mixture of butyl chloride and stannic chloride (and which may also comprise the aforementioned relatively inert solvent) is preferably in a granular or extruded state in order to present as much surface as possible to the reaction, and that if so desired the temperature of the three-component mixture may be raised sufficiently high to maintain the sodium in a liquid state.

It has also been indicated that the butyl chloride and stannic chloride components are first mixed in stoichiometric proportions, after which the metallic sodium is added to the mixture. In this respect, it has been found desirable to have the butyl chloride component present in excess of the stoichiometric requirement, although such excess need not be more than twice the stoichiometric requirement. Thus, while the weight ratio of butyl chloride and stannic chloride according to the aforementioned equation is 2:1, it is preferred to intermix these components in a ratio of 3:1 or 4:1. Such excess quantity of the butyl chloride component over the stoichiometric requirement is preferred in order to compensate for any loss of butyl chloride by the well-known Wurtz reaction, in which alkyl halides are condensed in the presence of sodium to yield hydrocarbons. In the present instance, such undesirable by-products would involve the butyl chloride component reacting with the sodium to form olefins, paraffins and sodium chloride, thereby reducing the effective quantities of the two components (namely, butyl chloride and sodium) in the reaction, and also resulting in a reduced yield of the final dibutyl tin dichloride end-product. Furthermore, by adding the aforementioned excess of the butyl chloride component, another undesirable side-reaction, namely, the reduction of the stannic chloride component to stannous chloride is also avoided.

This improved method of the present invention therefore has an advantage over the method first described above in that it does not require the addition of a large proportion of the stoichiometric amount of the sodium to initiate the reaction. The reaction provides, as the sodium is added, close control of the reaction temperature to avoid explosive effects in the hands of the operator. In addition, it will noted that this method permits complete consumption of the sodium and also permits control of reaction conditions, thus minimizing the formation of undesired by-products.

We claim:

1. In the production of dibutyl tin dichloride from butyl chloride, stannic chloride, and metallic sodium, the improved process of making said dichloride in greater yield and with increased safety while avoiding loss of sodium which comprises: adding the metallic sodium in an extended form having increased surface area to a mixture preheated to a temperature in the range of about 100 to about 110° C. and comprising 3 to 4 mols of butyl chloride and 1 mol of stannic chloride, said butyl chloride being present in an amount in excess of the stoichiometric requirement, said sodium being added stepwise to the mixture in successive quantities each less than the stoichiometrical requirement and at a rate effective to aid in maintaining the temperature of the mixture within said range so as to prevent a too violent reaction, the total amount of sodium added being effective to convert the reactants to dibutyl tin dichloride as a product of the process, and recovering said dibutyl tin dichloride from the reaction mixture.

2. Process according to claim 2 wherein the sodium added to said mixture is in granular form.

3. Process according to claim 2 wherein the sodium added to said mixture is in extruded form.

4. Process according to claim 2 wherein the sodium added to said mixture is in the liquid state.

5. Process according to claim 2 wherein an inert solvent is present in said mixture during the course of the reaction.

6. In the production of dibutyl tin dichloride from butyl chloride, stannic chloride, and metallic sodium, the improved process of making said dichloride in greater yield and with increased safety while avoiding loss of sodium which comprises: adding the metallic sodium to a mixture preheated to a temperature in the range of 60 to 110° C. and comprising 3 to 4 mols of butyl chloride and 1 mol of stannic chloride, said butyl chloride being present in an amount in excess of the stoichiometric requirement, said sodium being added gradually to the mixture in successive quantities each less than the stoichiometrical requirement and at a rate effective to aid in maintaining the temperature of the mixture within said range, the total amount of sodium added being effective to convert the reactants to dibutyl tin dichloride as a product of the process, and recovering said dibutyl tin dichloride from the reaction mixture.

7. Process according to claim 6 but wherein the temperature of the reaction mixture is maintained in the range of 95 to 110° C.

8. Process according to claim 6 but wherein the temperature of the reaction mixture is maintained in the range of the melting point of sodium to about 100° C.

9. In the production of dibutyl tin dichloride from butyl chloride, stannic chloride, and metallic sodium, the improved process of making said dichloride in greater yield and with increased safety which comprises: adding the metallic sodium to a mixture comprising 2 to 4 mols of butyl chloride and 1 mol of stannic chloride at a temperature of about 60 to 110° C. and in an amount effective to convert the reactants to dibutyl tin dichloride as a product of the process, said sodium being added stepwise to the mixture at a rate effective to aid in maintaining the temperature of the mixture within said range so as to prevent a too violent reaction.

10. Process according to claim 9 but wherein the temperature of the reaction mixture is maintained in the range of 95 to 110° C.

11. Process according to claim 9 but wherein the temperature of the reaction mixture is maintained in the range of the melting point of sodium to about 100° C.

12. In the production of dibutyl tin dichloride from butyl chloride, stannic chloride, and metallic sodium, the improved process of making said dichloride in greater yield and with increased safety and utilization of sodium which comprises: adding the metallic sodium to a mixture preheated to a temperature in the range of 60 to 110° C. and comprising 2 to 4 mols of butyl chloride and 1 mol of stannic chloride, said sodium being added in an amount effective to convert the reactants to dibutyl tin dichloride as a product of the process, maintaining the temperature of the mixture within said range so as to prevent a too violent reaction, and recovering said dibutyl tin dichloride from the reaction mixture.

HERBERT J. PASSINO.
GEORGE G. LAUER.

References Cited in the file of this patent

UNITED STATES PATENTS

| Number | Name | Date |
|---|---|---|
| 2,431,038 | Harris | Nov. 18, 1947 |